(12) United States Patent
Thomas et al.

(10) Patent No.: US 7,676,845 B2
(45) Date of Patent: Mar. 9, 2010

(54) SYSTEM AND METHOD OF SELECTIVELY SCANNING A FILE ON A COMPUTING DEVICE FOR MALWARE

(75) Inventors: Anil Francis Thomas, Redmond, WA (US); Michael Kramer, Yonkers, NY (US); Scott A Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1068 days.

(21) Appl. No.: 11/090,086

(22) Filed: Mar. 24, 2005

(65) Prior Publication Data

US 2006/0218637 A1    Sep. 28, 2006

(51) Int. Cl.
G06F 12/14 (2006.01)
G06F 7/04 (2006.01)

(52) U.S. Cl. .......................... 726/26; 713/189
(58) Field of Classification Search ............... 726/26; 713/189
See application file for complete search history.

(56) References Cited

U.S. PATENT DOCUMENTS

| 7,194,623 | B1* | 3/2007 | Proudler et al. ............. 713/164 |
| 2003/0061487 | A1* | 3/2003 | Angelo et al. ............... 713/176 |
| 2004/0221158 | A1* | 11/2004 | Olkin et al. ................. 713/170 |
| 2005/0160272 | A1* | 7/2005 | Teppler ..................... 713/178 |
| 2005/0278394 | A1* | 12/2005 | Oks et al. ................... 707/202 |

* cited by examiner

Primary Examiner—Christopher J Brown
(74) Attorney, Agent, or Firm—Workman Nydegger

(57) ABSTRACT

In accordance with this invention, a system, method, and computer-readable medium that selectively scans files stored on a computing device for malware is provided. One or more files may be sent from a trusted source to a computing device that implements the present invention. The integrity of the files that originate from a trusted source is validated using a signature-based hashing function. Any modifications made to files stored on the computing device are tracked by a component of the operating system. In instances when the file is not modified after being validated, an aspect of the present invention prevents the file from being scanned for malware when a scanning event is directed to the file. As a result, the performance of the computing device is improved as static files from trusted sources are not repeatedly scanned for malware.

16 Claims, 4 Drawing Sheets

110

| FILEID | VALIDATED | TIME STAMP |
|--------|-----------|------------|
| 0X1001 | 1 | 2/1/05, 16:23:56 |
| 0X1002 | 1 | 1/13/05, 2:52:12 |
| 0X1003 | 1 | 4/10/03, 20:01:23 |
| 0X1004 | 0 | 6/21/04, 8:58:26 |
| 0X1005 | 0 | 8/27/04, 13:18.41 |

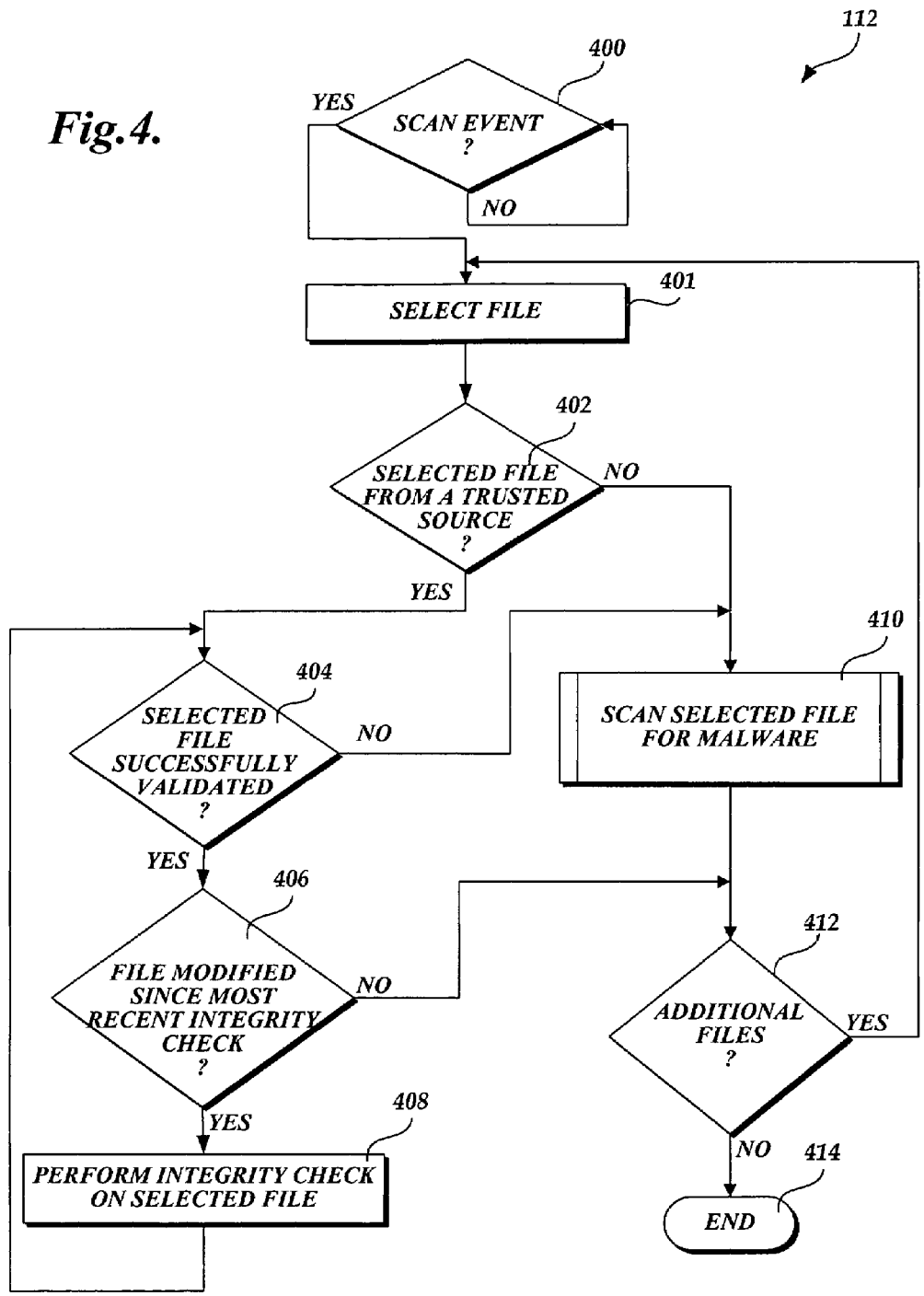

SYSTEM AND METHOD OF SELECTIVELY SCANNING A FILE ON A COMPUTING DEVICE FOR MALWARE

FIELD OF THE INVENTION

The present invention relates to computing devices and, more particularly, to selectively scanning files stored on a computing device for malware.

BACKGROUND OF THE INVENTION

As more and more computers and other computing devices are interconnected through various networks, such as the Internet, computer security has become increasingly more important, particularly from invasions or attacks delivered over a network or over an information stream. As those skilled in the art and others will recognize, these attacks come in many different forms, including, but certainly not limited to, computer viruses, computer worms, system component replacements, denial of service attacks, even misuse/abuse of legitimate computer system features, all of which exploit one or more computer system vulnerabilities for illegitimate purposes. While those skilled in the art will recognize that the various computer attacks are technically distinct from one another, for purposes of the present invention and for simplicity in description, all malicious computer programs that spread on computer networks, such as the Internet, will be generally referred to hereinafter as computer malware or, more simply, malware.

When a computer system is attacked or "infected" by computer malware, the adverse results are varied, including disabling system devices; erasing or corrupting firmware, applications, or data files; transmitting potentially sensitive data to another location on the network; shutting down the computer system; or causing the computer system to crash. Yet another pernicious aspect of many, though not all, computer malware is that an infected computer system is used to infect other computer systems that are communicatively connected by a network connection.

A traditional defense against computer malware and, particularly, against computer viruses and worms, is antivirus software that is available from several software vendors. Most antivirus software identifies malware by matching patterns within data to what is referred to as a "signature" of the malware. Typically, antivirus software scans for malware signatures when certain events are scheduled to occur, such as when data is going to be written or read from an input/output ("I/O") device. As known to those skilled in the art and others, computer users have ongoing needs to read and write data to I/O devices, such as hard drives, floppy disks, compact disks ("CDs"), etc. For example, a common operation provided by some software applications is to open a file stored on an I/O device and display the contents of the file on a computer display. However, since opening a file may cause malware associated with the file to be executed, antivirus software typically performs a scan or other analysis of the file before the open operation is satisfied. If malware is detected, the antivirus software that performed the scan may prevent the malware from being executed, for example, by causing the open operation to fail.

Typically, when a new malware is identified, software vendors provide a software update to antivirus software that contains a signature of the new malware. When the update is installed, the antivirus software is able to identify the new malware. However, existing systems are unable to easily determine if files on the computing device are capable of being infected with the new malware. Instead, every file on a computing device will typically be scanned when a previously unknown malware signature becomes available. Those skilled in the art and others will recognize that scanning a file for malware is a resource intensive process. As a result, the performance of the computing device may suffer when new malware is released on a communication network.

One proposed technique for preventing duplicative scans for malware is to categorize files on a computing device as either originating from trusted or untrusted sources. In this example, files from an untrusted source will be scanned every time a software update that contains a new malware signature is provided. However, files from trusted sources may not be scanned for malware if the integrity of the files can be verified. For example, a trusted source may provide a representation of a file that was processed with a function such as a hashing algorithm. Antivirus software may use the processed representation of the file to determine if the file was modified after the file was received from the trusted source. In instances when a file was not modified, a scan of the file is not performed. However, the method currently used to determine whether the file was modified after being received from the trusted source, includes comparing the processed representation of the file received from a trusted source to a newly computed representation of the file. In instances when the two processed representations of the files match, then the file was not modified after being received from the trusted source. Thus, for example, each time a new signature is received, the antivirus software would be required to process the representation of the file on the computing device with the same function used by the trusted source. Then the two processed representations of the file would be compared. In this example, the computational resources required to determine whether the file is still trusted before scanning the file, is roughly equivalent the resources required to simply perform an antivirus detection scan on the file. Therefore, the performance of the computing device is not significantly improved if the technique described above is implemented.

SUMMARY OF THE INVENTION

The present invention addresses the above-identified needs by providing a system, method, and computer-readable medium for selectively scanning files on a computing device for malware. In general terms describing one aspect of the present invention, a file is received at a computing device that implements the present invention from a trusted source such as an operating system provider or authoritative application provider. At the time the file is received, an integrity check is performed on the file that insures the file received corresponds positively to the representation of the file maintained by the trusted source, thereby validating the integrity of the file. More specifically, a unique signature of the file is generated and compared to a signature of the file that was generated by the trusted source. If the integrity of the file is validated as originating from the trusted source, an aspect of the present invention prevents the file from being scanned for malware when a scanning event is directed to the file. In addition, after the file is received and validated, any changes made to the file are tracked by a component of the operating system. A new integrity check will not be performed so long as this component of the operating system determines that the contents of the file have not been modified. As a result, the performance of the computing device is improved as files received from a trusted source that are not modified by a third party, after being received from the trusted source, are not revalidated as originating from the trusted source unless a positive indicator is received from the operating system that the file was modified.

In another aspect of the present invention, a software system that improves the performance of a computing device by selectively scanning files for malware is provided. In an exemplary embodiment, the software system includes an integrity table for associating a file received from a trusted source with data indicative of whether the file was modified after being received from the trusted source. Also, the software system includes a file validation application that updates the integrity table when a file from a trusted source is modified. For example, when a trusted source, such as an application program provider installs a software update on a computer, one or more files associated with the software update will be revalidated as originating from the trusted source. In this instance, when installation of the software update is scheduled to occur, the file validation application may cause an integrity check on files associated with the software update that determines whether the contents of the files are still from the trusted source. In this embodiment of the present invention, the software system also includes a selective scan module configured to query the integrity table and determine whether a file that is the object of a scan event needs to be scanned for malware.

In still another embodiment, a computer-readable medium is provided with contents, i.e., a program that causes a computer to operate in accordance with the methods described herein.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a pictorial depiction of an exemplary integrity table with entries designed to improve the performance of a computing device by identifying files received from a trusted source that have/have not been modified; and FIG. 4 is a flow diagram illustrating one exemplary embodiment of a method that determines whether to perform a scan for malware when a scan event occurs that is formed in accordance with the present invention.

DETAILED DESCRIPTION

In accordance with this invention, a system, method, and computer-readable medium that selectively scans files stored on a computing device for malware is provided. One or more files may be sent from a trusted source to a computing device that implements the present invention. Any changes made to files stored on the computing device are tracked by a component of the operating system. When a scan event is directed to a file from a trusted source, the integrity of the file may be validated as originating from the trusted source through a computer-implemented comparison. The comparison determines whether the integrity of the file was previously validated as originating from a trusted source by performing a lookup in an integrity table. In instances when the file was not previously validated, an integrity check is performed to insure that the file originated from a trusted source. If the integrity of the file is validated, an aspect of the present invention prevents the file from being scanned for malware. As a result, the performance of the computing device is improved as files from trusted sources that are not modified are not scanned for malware or revalidated as originating from the trusted source.

Although the present invention will primarily be described in the context of reducing the number of files that are scanned for malware in an antivirus system, those skilled in the relevant art and others will appreciate that the present invention is also applicable to other areas than those described. The following description first provides an overview of a system in which the present invention may be implemented. Then applications and program modules that implement the present invention are described. The illustrative examples provided herein are not intended to be exhaustive or to limit the invention to the precise forms disclosed. Similarly, any steps described herein may be interchangeable with other steps or combinations of steps in order to achieve the same result.

Figure 1:
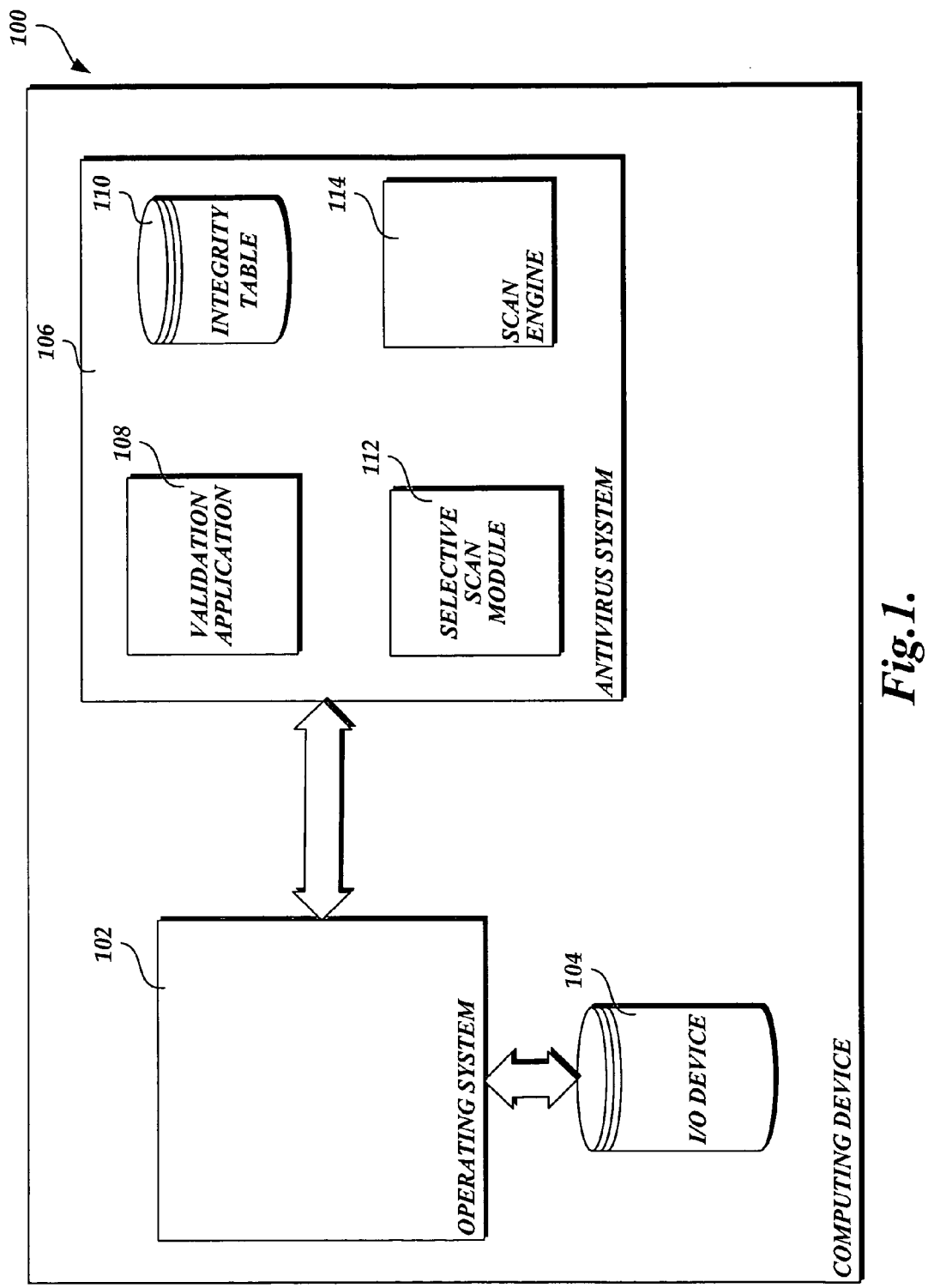
FIG. 1 is a block diagram that depicts a computing device that includes software components suitable to prevent unnecessary scans for malware from being performed.

Referring now to FIG. 1, the following is intended to provide an exemplary overview of one suitable computing device 100 in which aspects of the present invention may be implemented. The computing device 100 may be any one of a variety of devices including, but not limited to, personal computing devices, server-based computing devices, personal digital assistants, cellular telephones, other electronic devices having some type of memory, and the like. For ease of illustration and because it is not important for an understanding of the present invention, FIG. 1 does not show the typical components of many computing devices, such as a CPU, keyboard, a mouse, a printer or other I/O devices, a display, etc. However, the computing device 100 depicted in FIG. 1 does include an operating system 102, an I/O device 104, and an antivirus system 106. As further illustrated in FIG. 1, the antivirus system 106 is comprised of several components, including, but not limited to, a validation application 108, an integrity table 110, a selective scan module 112, and a scan engine 114. Collectively, aspects of the present invention implemented in the operating system 102 and the antivirus system 106 provide a way to identify files from trusted sources that do not need to be scanned for malware.

As illustrated in FIG. 1, the computing device 100 stores an operating system 102 for controlling the general operation of the computing device 100 and providing services and resources requested by application programs. The operating system 102 may be a general purpose operating system that is commercially available, such as a Microsoft® operating system, UNIX® operating system, or Linux® operating system. As known to those skilled in the art and others, a general purpose operating system performs basic tasks, such as managing the ("I/O") of a computing device and tracking data stored in memory. For example, an application program may make a request to the operating system 102 in order to write data to the I/O device 104. Generally described, the I/O device 104 may be a local hardware device, such as a hard drive, floppy disk, flash memory, tape drive, compact disk ("CD"), etc. Alternatively, the I/O device 104 may be a remote hardware device connected to the computing device 100 through a network connection. In any event, the operating system 102 manages the communication of data between I/O devices and application programs. Also, in one embodiment of the present invention, the operating system provides services to components of the antivirus system 104. For example, the operating system 102 may be configured to track changes, if any, made to a file stored on the I/O device 104. As described in further detail below, aspects of the present invention may use these types of services provided by the operating system 102 to determine if the file needs to be scanned for malware or validated as originating from a trusted source.

As illustrated in FIG. 1, the antivirus system 106 includes a scan engine 114 designed to detect malware from file data. Many different software vendors include a scan engine or equivalent mechanism in antivirus software that is designed to identify data characteristic of malware. One known technique employed by some existing antivirus software for identifying malware includes obtaining a copy of the malware "in the wild." Then program code that implements the malware is processed with a function that converts the program code into a "signature" that may be used to uniquely identify the malware. Then, in response to an event such as an I/O request, the scan engine 114 searches data associated with the request for any known malware signatures. The scan engine 114 illustrated in FIG. 1 may employ this known technique to scan file data for a malware signature. However, the scan engine 114 may be configured to perform additional types of analysis in order to determine if a file is infected with malware. For example, some antivirus software "emulates" program execution to detect behaviors that are characteristic of malware. Also, increasingly, heuristic techniques are being used to detect malware. In any event, it should be well understood that any of these and other malware detection techniques not described herein may be implemented in the scan engine 114.

The present invention is designed to allow the antivirus system 106 to execute more efficiently by reducing the number of files that need to be scanned for malware or validated as originating from a trusted source. Aspects of the present invention will typically be implemented in one or more components of the antivirus system 106, such as in the validation application 108 and the selective scan module 112.

As described in further detail below with reference to FIG. 2, the validation application 108 is configured to begin when a file is received from a trusted source. Then, an integrity check is performed on the file that determines whether the contents of the file have been modified by a third party. After the initial integrity check, the validation application 110 adds an entry for the file in the integrity table 110. Generally described, the integrity table 110 stores information about each file on the computing device 100 that was received from a trusted source. More specifically, each file in the table 100 is associated with a variable that is indicative of whether the contents of the file have been successfully validated as originating from the trusted source.

The validation application 108 is responsible for keeping the integrity table "up-to-date." For example, when a software update that contains a new malware signature is received, the validation application 108 uses time stamps in the integrity table 110 to identify files received from a trusted source that were modified since their most recent integrity check. For example, after the new malware signature is received, another integrity check is performed on files that were modified since the previous integrity check to determine if the modification originated from the trusted source. Then an entry in the integrity table 100 is updated with the results of this most recent integrity check.

As described in further detail below with reference to FIG. 4, the selective scan module 112 prevents unnecessary scans of files from being performed when a scan event occurs. More specifically, the selective scan module 112 prevents a file that originated from a trusted source that has not been modified by a third party from being scanned for malware or re-validated as originating from a trusted source. In summary, when a scan event directed to a file occurs, the selective scan module 112 determines if the file is from a trusted source. In instances when the file is not from a trusted source, the file will be scanned for malware. However, in instances when the file is from a trusted source, a lookup of the file's entry in the integrity table 110 is performed. Data in the integrity table 110 is used to determine whether the file was modified since the file's most recent integrity check. If the file was not modified, a scan of the file is not performed. Conversely, if the file was modified, the selective scan module 112 may cause an integrity check and/or a scan for malware to be performed on the file.

As mentioned previously, the performance of the computing device 100 is improved if the number of files scanned for malware is reduced. Aspects of the present invention are able to significantly reduce the number of files scanned for malware thereby allowing system resources to be allocated to other processes. Those skilled in the art and others will recognize that most files stored on a computing device consist of software routines that implement the functionality of an operating system or application program. Typically, the data in these types of files remains static because application programs and operating systems are updated infrequently. Thus, a high percentage of files on a computing device may be bypassed by an antivirus system when a scan event occurs.

As illustrated in FIG. 1, some of the components included in the computing device 100, e.g., the operating system 102, I/O device 104, and antivirus system 106 are communicatively connected. For example, the antivirus system 106 is able to make requests to the operating system 102 and have those requests satisfied. Also, as illustrated in FIG. 1, the operating system 102 manages the storage and data on the I/O device 104. As known to those skilled in the art and others, FIG. 1 is a simplified example of one computing device 100 capable of performing the functions of the present invention. Actual embodiments of the computing device 100 will have additional components not illustrated in FIG. 1 or described in the accompanying text. Also, FIG. 1 depicts one component architecture for the antivirus system 106, but other component architectures are possible.

Now with reference to FIG. 2, a flow diagram that illustrates one exemplary embodiment of the validation application 108 will be described. In one embodiment, data identified by the validation application 108 is stored in a data structure (e.g., the integrity table 110). The data is then used by the selective scan module 112 (described below with reference to FIG. 4) to identify files received from a trusted source, which do not need to be scanned for malware. With continuing reference to FIG. 1 and the accompanying description, an exemplary validation application 108 illustrated in FIG. 2 will now be described.

Figure 2:
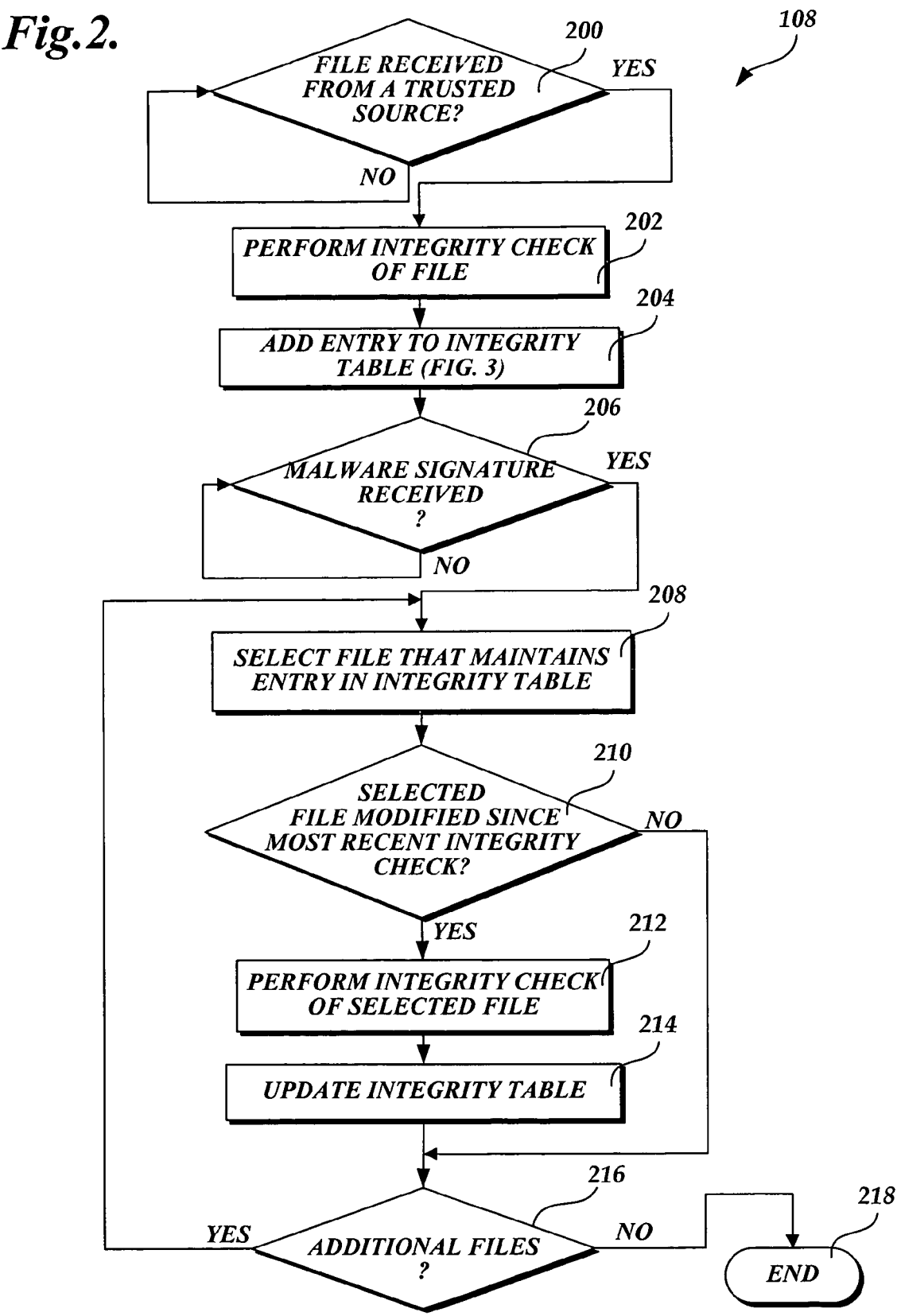
FIG. 2 is a flow diagram illustrating one exemplary embodiment of a file validation application that updates a table that tracks whether files received from a trusted source have been modified.

As illustrated in FIG. 2, the validation application 108 remains idle, at block 200, until a file is received from a trusted source at a computing device that implements the present invention. As mentioned previously, a trusted source may be an application program provider, an operating system provider, or any other entity that does not distribute malware. In one embodiment of the present invention, the trusted source also provides validation data when a file is transmitted to a computing device that implements the present invention. For example, files that implement the functionality of an operating system may be processed with a function that generates validation data. The validation data is a signature that uniquely identifies the file and may be used to determine if the file has been modified. Those skilled in the art and others will recognize that a number of widely available hashing algorithms may be used by the trusted source to generate validation data. For example, the secure hashing algorithm commonly known as "SHA-1" may be used to generate the validation data. In any event, files that implement the functionality of the operating system are processed with the hashing algorithm and stored in a central database that is maintained by the operating system provider (hereinafter referred to as the "catalog database"). Typically, validation data stored in the catalog database is protected so that modifications to operating systems files may be identified.

At block 202, the validation application 108 performs an integrity check on the file received at block 200. More specifically, at block 202, the file is processed with the same function that was used by the trusted source to generate the validation data. For example, if the trusted source used the "SHA-1" hashing algorithm to generate the validation data, the same function is applied to the file at block 202. Then the data generated by the hashing algorithm is compared to the validation data that was received from the trusted source. If the validation data associated with the file matches that data generated by applying the hashing algorithm to the file, at block 202, then the file has not been modified since being received from the trusted source. Conversely, if the data does not match, the file was modified and has the potential to be infected with malware.

As illustrated in FIG. 2, at block 204, the validation application 108 adds an entry to the integrity table 110 (FIG. 1) for the file received at block 200. As mentioned previously, the integrity table 110 stores information about each file that was received from a trusted source on the computing device 100. Also, each file with an entry in the integrity table 100 is associated with a variable that is indicative of whether the contents of the file were successfully validated as originating from a trusted source.

For illustrative purposes and by way of example only, a representative integrity table 110 is illustrated in FIG. 3. The integrity table 110 consists of three columns, each of which contains multiple entries. The columns are identified as FILEID 300, VALIDATED 302, and TIME STAMP 304. The FILEID 300 column contains a unique identifier for each file that is received from a trusted source and stored on a computing device. Those skilled in the art will recognize that existing systems that manage the storage of data in a file system assign a unique identifier to files stored on a computing device that may be obtained and inserted into the integrity table 110. The VALIDATED 302 column stores a value that identifies the state of the file. For example, the VALIDATED 302 column contains a value that is either a "0" or a "1." In one embodiment of the present invention, if the VALIDATED 302 column contains a "1," then the associated file was validated as originating from a trusted source. Alternatively, if the VALIDATED 302 column contains a "0," then the file was not validated as originating from a trusted source. Also, the TIME STAMP 306 column contains a value indicative of the last time (e.g., month, day, year, etc.) an attempt to validate the file occurred. As described in more detail below, the TIME STAMP 306 column may be used to determine whether the contents of a file have change since last being validated. It should be well understood that, typically, the integrity table 110 will be "cached" in an area of memory designed for fast access. However, changes made to the integrity table 110 will be written back to nonvolatile memory, so that the changes will persist through a "reboot" of a computing device.

Returning to the validation application 108 illustrated in FIG. 2, at decision block 206, the application 108 remains idle until a new malware signature is received at a computing device that implements the present invention. When a new malware begins spreading on a communication network, software vendors typically provide an update to antivirus systems so that the new malware may be identified. In the prior art, when a new malware signature was received, each file on a computing device was considered to be potentially infected with the malware. As a result, data associated with a file previously identified as being free from a malware infection was changed so that the file would be scanned for malware when a scan event was directed to the file. In accordance with one aspect of the present invention, a file from a trusted source that is not modified is not scanned for malware when an antivirus system is updated to identify the new malware.

In one embodiment of the present invention, software updates that contain signatures of new malware are automatically obtained from a download center. In this instance, a software update may be obtained at regular intervals or whenever the new software update becomes available. Also, a software update that contains a new malware signature may be obtained manually. For example, a user may determine that a computing device is vulnerable to a malware infection and download a software update that is published on a Web site. However, those skilled in the art and others will recognize that a new malware signature may be received in different contexts than those described above. Thus, the examples provided above that describe specific ways in which a malware signature may be received should be construed as exemplary and not limiting.

At block 208, the validation application 108 selects a file received from a trusted source that maintains in entry in the integrity table 110. When a new malware signature is received, the validation application 108 causes data in the integrity table 110 to be updated. By updating the integrity table 110, in this instance, the validation application 108 minimizes the computational resources required to scan for malware when a scan event is directed to a file from a trusted source. Since a file that maintains an entry in the integrity table 110 may be selected using techniques generally known in the art, the technique used at block 208 will not be described in further detail here.

As illustrated in FIG. 2, at decision block 210, the validation application 108 determines whether the selected file was modified since the file's most recent integrity check. If the file was modified, the validation application 108 proceeds to block 212. Conversely, if the file was not modified, the validation application 108 proceeds to block 216 described below. The determination of whether a file was modified may be performed using a number of different techniques of which the following are only examples.

In one embodiment of the present invention, a component of the operating system that tracks changes made to an I/O device is used to determine if the selected file was modified since the file's most recent integrity check. For example, some operating systems provide a shadow copy service designed to reconstruct previous versions of a file or an entire volume (e.g., a logical collection of files). More specifically, at a configurable interval, a shadow copy service takes a snapshot of a selected file. In order to reduce the amount of data required to reconstruct a previous version of the file, the shadow copy service stores information about changes made to the file. Stated differently, each saved version of a file is not maintained by the shadow copy service. Instead, if a user modifies a file, the shadow copy service stores enough information about the modification to reconstruct the previous version of the file. Those skilled in the art and others will recognize that a shadow copy service could provide an Application Programming Interface ("API") that allows other software modules to determine when a file was last modified. In this embodiment of the present invention, the file stamp associated with the selected file in the integrity table 110 is compared to the time the file was last modified, as indicated by the shadow copy service. Obviously, if the file stamp in the integrity table 110 is more recent then the modification time as indicated by the shadow copy service, then the file was not modified since the most recent integrity check.

In another embodiment of the present invention, a unique identifier assigned to the file by the operating system is used to determine whether modifications were made to the selected file since the file's most recent integrity check. Those skilled in the art and others will recognize that each volume of an I/O device has a location where information about files on the volume is stored and central management of the volume is performed. For example, the Windows™ NT File System maintains a master file table that contains a record for each file on a volume. When a file is created, a new record for the file is inserted into the master file table and a predetermined amount of space is allocated to store attributes of the file. In this type of system, Update Sequence Numbers ("USNs") are sequentially assigned to files and recorded in the master file table when data is scheduled to be written to a file. Since USN numbers are assigned sequentially, the USN number assigned to the selected file provides a de facto timestamp indicative of when the file was last modified. In one embodiment of the present invention, the integrity table 110 may be modified to include the USN number assigned to a file since its most recent integrity check. Then, the validation application 108 may compare the USN number currently assigned to the selected file with the USN number that is recorded in the integrity table 110 to determine if a file has been modified since the file's last integrity check.

In yet another embodiment of the present invention, a filter driver that "hooks" into the I/O system of the computing device may be used to determine if a file was modified since the file's last integrity check. Those skilled in the art and others will recognize that a filter driver may be configured to monitor the communication between an operating system and an I/O device. In this embodiment, the filter driver records each modification made to a file that is stored on a volume. Then, to determine whether the selected file was modified since the file's most recent integrity check, the time stamp associated with the selected file in the integrity table 110 is compared to the time the file was last modified as recorded by a filter driver. Obviously, if the file stamp in the integrity table 110 is more recent then the modification time as indicated by the filter driver, then the file was not modified since the most recent integrity check.

At block 212, the validation application 108 performs an integrity check on the selected file. As mentioned previously, an integrity check determines whether a file has been modified since the file's most recent integrity check. However, since the process for performing an integrity check was described above with reference to block 202, further description of that process will not be described in further detail here.

As illustrated in FIG. 2, at block 214, the validation application updates the integrity table 110 with the data generated by the integrity check performed at block 212. For example, the integrity check may indicate that the selected file was modified since been received from a trusted source. In this instance, the VALIDATED 302 variable associated with the selected file in the integrity table 110 will be set to indicate that the file was not validated. Also, the TIME STAMP 304 column will be updated with the time of this integrity check.

At decision block 216, the validation application 108 determines if any files contained in the integrity table 110 have not been selected previously. Typically, when a new malware signature is received, every file with an entry in the integrity table 110 is analyzed to determine if modifications were made to the file since the file's most recent integrity check. The validation application 108 sequentially selects all of the files in the integrity table 110 and determines if the selected file was modified. In any event, if additional files do not need to be selected, the validation application 108 proceeds to block 218, where it terminates. Conversely, if at least one additional file will be selected, the application 108 proceeds back to block 208 and blocks 208 through 216 repeat until all of the files in the integrity table 110 have been selected.

Now with reference FIG. 4, a selective scan module 112 depicted in FIG. 1 will now be described. Those skilled in the art and others will recognize that the selective scan module 112 is designed to work in conjunction with the validation application 108 and integrity table 110 described above with reference to FIGS. 2 and 3. With continuing reference to FIGS. 1-3 and the accompanying descriptions, an exemplary selective scan module 112 illustrated in FIG. 4 will now be described.

At decision block 400, the selective scan module 112 remains idle and waits for an event that requires one or more files to be scanned for malware. As will be appreciated by those skilled in the art and others, antivirus software may initiate a file scan in many different instances. For example, a computer user may issue a command to start execution of a program by "double clicking" on an icon associated with the program. To prevent malware from being executed, antivirus software may cause one or more files associated with the program to be scanned before the program is loaded into memory and executed. Also, antivirus software may be configured to scan all of the files on a computing device for malware. In this instance, files are sequentially selected and scanned. However, as known to those skilled in the art and others, the examples provided above should be construed as exemplary and not limiting, as one or more files may be scanned for malware in other contexts not described herein.

At block 401, the selective scan module 112 selects a file that is an object of the scan event received at block 400. As described above, one or more files may by the object of a scan event. Since techniques for selecting a file are generally known in the art, further description of the technique used at block 401 will not be described in further detail here.

As illustrated in FIG. 4, at decision block 402, the selective scan module 112 determines whether the selected file originated from a trusted source. As mentioned previously, for each file on a computing device that originated from a trusted source, an entry for the file is maintained in the integrity table 110. Thus, at decision block 402, the selective scan module 112 determines whether the selected file maintains an entry in the integrity table 110. In instances when the file does have an associated entry in the integrity table 110, the selective scan module 112 determines that the file originated from a trusted source and proceeds to block 404. Conversely, if the file does not have an associated entry in the integrity table 110, the file is not from a trusted source and the selective scan module 112 proceeds to block 410.

At decision block 404, the selective scan module 112 determines whether the file was successfully validated at the most recent integrity check. More specifically, at block 404, a "lookup" of the integrity table 110 for data associated with the selected file is performed. As mentioned previously, the present invention maintains an integrity table 110, which contains information about each file on a computing device that originated from a trusted source. Collectively, the validation application 108 and integrity table 110 track whether a file was successfully validated as originating from the trusted source in the most recent integrity check. At block 404, the variable in the integrity table 110 that is indicative of whether a file was successfully validated is identified. If the variable indicates that the file was successfully validated, then the selective scan module 112 proceeds to block 406. Conversely, if the variable indicates that the file was not successfully validated, the module 112 proceeds to block 410, described below.

As illustrated in FIG. 4, at decision block 406, the selective scan module 112 determines whether the selected file was modified since the file's most recent integrity check. If the file was modified, the selective scan module 112 proceeds to block 408, described below. Conversely, if the file was not modified, the selective scan module 112 proceeds to block 412. Since methods for determining whether a file was modified since the file's most recent integrity check were described above with reference to FIG. 2 (at block 210), further description of those methods will not be provided here. Significantly, the selective scan module 112 identifies files that were not modified since being received from a trusted source. For these types of files, the present invention prevents the file from being scanned for malware.

At block 408, the selective scan module 112 performs an integrity check on the selected file. If block 408 is reached, the file was modified since the most recent integrity check. As mentioned previously, an integrity check determines whether data in a file, including any modifications made to the file, originated from a trusted source. However, since the process for performing an integrity check was described above with reference to FIG. 2 (at block 202), further description of that process will not be provided here.

At block 410, the selective scan module 112 causes a scan for malware to be performed on the selected file. As mentioned previously, software-implemented routines in the scan engine 114 (FIG. 1) are configured to scan a file for malware. In one embodiment of the present invention, the scan performed at block 410 includes matching patterns of data to a malware signature. However, the scan may include additional malware identification methods. For example, the scan performed at block 410 may include identifying heuristic factors that are characteristic of malware or emulating program behavior in a virtual operating environment. In any event, it should be well understood that the techniques for identifying malware described above should be construed as exemplary and not limiting. The selective scan module 112 may be implemented with any number of malware scanning techniques not described herein.

At decision block 412, the selective scan module 112 determines if any files that were the object of the scan event received at block 400 have not been selected previously. If additional file(s) do not need to be selected, the selective scan module 112 proceeds to block 414 where it terminates. Conversely, if at least one additional file will be selected, the selective scan module 112 proceeds back to block 401 and blocks 401 through 412 repeat until all of the files that are the object of the scan event have been selected.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a computing device that includes a processor and system memory, the computing device also including an operating system for managing data object storage for the computing device, a method for determining if data objects that are to be accessed by the computing device contain malware, the method comprising:
   access an indication that a plurality of objects are to be accessed at the computing device;
   selectively scanning one or more of the plurality of objects for malware, selective scanning including scanning at least one of the plurality of objects and bypassing the scanning of at least one of the plurality of objects, including for each of the plurality of objects:
      if the object was not received from a trusted source, scanning the object for malware; and
      if the object was received from a trusted source:
         the processor referring to an integrity table, the integrity table including an entry for each object received from a trusted source, each entry including: a file ID, a validated value, and a time stamp, the file ID uniquely identifying the object, the validated value indicating whether or not the object was validated, and the time stamp indicating the last time an attempt was made to validate the object; and
         if the validated value indicates that the object has not been validated, scanning the object for malware; and
         if the validated value indicates that the object has been validated, referring to the time stamp to determine if the object has been modified since the last attempt to validate the object;
            if the object has not been modified since the last attempt to validate the object, bypassing the scanning of the object to conserve computing device resources; and
            if the object has been modified since the last attempt to validate the object, performing an integrity check on the object to attempt to validate the object.

2. The method as recited in claim 1, wherein an object that is received from a trusted source is a file and wherein the file contains program code that implements functionality of an operating system.

3. The method as recited in claim 1, wherein an object that is received from a trusted source is a file and wherein the file contains program code that implements functionality of an application program.

4. The method as recited in claim 1, wherein receiving an object from a trusted source includes receiving a first signature of the object processed with a hash function.

5. The method as recited in claim 4, performing an integrity check on the object to attempt to validate the object includes:
   processing the object with a hash function to generate a second signature of the object; and
   comparing the first and second signatures.

6. The method as recited in claim 5, wherein performing an integrity check on the object to attempt to validate the object further includes updating the time stamp in the integrity table entry for the object to indicate when the comparison between the first and second signatures occurred.

7. The method as recited in claim 1, wherein updating the time stamp in the integrity table entry for the object is performed by a filter driver that monitors communication between the operating system and an I/O device.

8. The method as recited in claim 1, wherein updating the time stamp in the integrity table entry for the object is performed by a shadow copy service that is configured to report a time of a most recent modification from an application programming interface.

9. The method as recited in claim 8, further comprising comparing the time of the most recent modification to the time as reported by the shadow copy service with a time stamp that records when the object data was most recently validated as originating from the trusted source.

10. A software system for selectively scanning objects accessible to a computing device for malware, the software system comprising:
   a processor;
   a memory component communicatively coupled to the processor, the memory component having stored therein data and computer-executable instructions representing a malware system, the malware system including a validation application, an integrity table, and a selective scan module, wherein the integrity table includes an entry for each object received from a trusted source, each entry including: a file ID, a validated value, and a time stamp, the file ID uniquely identifying the object, the validated value indicating whether or not the object was validated, and the time stamp indicating the last time an attempt was made to validate the object the malware system, and wherein the malware system is configured to:
   access an indication that a plurality of objects are accessed at the computing device;
wherein the selective scan module is configured to:
   scan one or more of the plurality of objects for malware, selective scanning including scanning at least one of the plurality of objects and bypassing the scanning of at least one of the plurality of objects, including for each of the plurality of objects:
      scan the object for malware when the object was not received from a trusted source; and
      refer to the validate value in an integrity table entry for the object when the object was received from a trusted source;
         scan the object for malware when the validated value from the integrity table entry indicates that the object has not been validated and the object has been received from a trusted source;
         refer to the time stamp in the integrity table entry for the object when the validated value from the integrity table entry indicates that the object has been validated and the object has been received from a trusted source;
      determine if the object has been modified since the last attempt to validate the object based on the time stamp from the integrity table entry when the object has been validated and the object has been received from a trusted source; and
      bypass the scanning of the object to conserve computing device resources when the object has not been modified since the last attempt to validate the object and the object has been received from a trusted source; and
   wherein the validation application is configured to:
      perform an integrity check on the object to attempt to validate the object when the object has been modified since the last attempt to validate the object and the object has been received from a trusted source.

11. The software system as recited in claim 10, wherein the selective scan module being configured to scan an object comprises selective scan module being configured to pass objects to a scan engine configured to search objects for malware.

12. The software system as recited in claim 10, further comprising an operating system that provides a shadow copy service configured to update time stamps in integrity table entries.

13. The software system as recited in claim 10, wherein the validation application is further configured to update the integrity table with results of additional integrity checks when a new malware signature is obtained.

14. A computer program product for use at a computer system, the computer program product for implementing a method for bypassing scanning of one or more objects, from among a plurality of objects that are to be scanned for malware prior to permitting computer system access to the plurality of objects, the computer program product comprising one or more computer-readable storage medium having stored thereon computer-executable instructions that, when executed at a processor, cause the computer system to perform the method, including the following:
   receive one or more files from a first trusted source, the first trusted source from among one or more trusted sources;
   perform a first integrity check on each of the one or more files to determine that data in the one or more files originated from the first trusted source;
   maintain entries in an integrity table for each of the plurality of files received from any of the plurality of trusted sources, each entry in the integrity table including: a file ID, a validated value, and a time stamp, the file ID uniquely identifying the object, the validated value indicating whether or not the object was validated, and the time stamp indicating the last time an attempt was made to validate the object;
   receive an indication that a plurality of files are to be checked for malware, the plurality of files including at least one of the one or more files received from the first trusted source and at least one other file received from a different source;
   checking the plurality of files for malware based on the source of each file in the plurality of files and through reference to the integrity table, including:
      scanning any file not received from one of the plurality of trusted sources for malware;
      scanning any file received from one of the plurality of trusted sources for malware that has a validated value indicative of the file not being validated;
      validating the integrity of any file received from one of the plurality of trusted sources that has a validated value indicative of the file being validated and a time stamp indicating that the file has been modified since the file was last validated; and
         bypassing scanning and validating for any file received from one of the plurality of trusted sources that has a validated value indicative of the file being validated and a time stamp indicating that the file has not been modified since the file was last validated.

15. The computer program product as recited in claim 14, further comprising computer-executable instructions that, when executed, cause the computer system to:
   receive a first signature of a file from the first trusted source;
   generate a second signature of the file by processing the file with a hash function; and
   compare the first signature of the file with the second signature of the file.

16. The computer program product as recited in claim 14, further comprising computer-executable instructions that, when executed, cause the computer system to:
   assign a sequence number to a file when data is scheduled to be written to the file;
   record the sequence number when a determination is made regarding whether the file data originated from a trusted source; and
   compare a current sequence number assigned to the file with a recorded sequence number.

* * * * *